United States Patent
Sharma et al.

(10) Patent No.: US 12,470,639 B2
(45) Date of Patent: Nov. 11, 2025

(54) USE OF CONNECTORS

(71) Applicant: DISH Wireless L.L.C., Littleton, CO (US)

(72) Inventors: Nikhil Sharma, Highlands Ranch, CO (US); Scott Caldarella, Parker, CO (US); Ramanthan Sekkappan, Prosper, TX (US)

(73) Assignee: DISH Wireless L.L.C., Littleton, CO (US)

( * ) Notice: Subject to any disclaimer, the term of this patent is extended or adjusted under 35 U.S.C. 154(b) by 45 days.

(21) Appl. No.: 18/452,987

(22) Filed: Aug. 21, 2023

(65) Prior Publication Data

US 2025/0071189 A1 Feb. 27, 2025

(51) Int. Cl.
*H04L 67/60* (2022.01)
*G06F 9/54* (2006.01)
*H04L 67/56* (2022.01)

(52) U.S. Cl.
CPC .............. *H04L 67/60* (2022.05); *G06F 9/547* (2013.01); *H04L 67/56* (2022.05)

(58) Field of Classification Search
CPC ... H04L 63/0281; H04L 67/565; H04L 69/08; H04L 67/60
See application file for complete search history.

(56) References Cited

U.S. PATENT DOCUMENTS

| | | | |
|---|---|---|---|
| 6,247,048 B1 * | 6/2001 | Greer | H04L 69/16 709/227 |
| 7,386,551 B1 * | 6/2008 | Gebauer | G06F 16/972 |
| 7,810,106 B2 * | 10/2010 | Kapadia | G06F 16/954 719/328 |
| 9,148,492 B2 * | 9/2015 | Ishino | G06F 3/1298 |
| 9,547,532 B2 * | 1/2017 | Loughry | G06F 9/541 |
| 10,193,877 B2 | 1/2019 | Chizhov et al. | |
| 10,523,531 B2 * | 12/2019 | Zuerner | H04L 41/5051 |
| 10,733,307 B1 * | 8/2020 | Wolters | G06F 21/604 |
| 11,647,095 B1 | 5/2023 | Barsade et al. | |
| 2003/0018499 A1 * | 1/2003 | Miller | G06Q 10/02 705/5 |

(Continued)

FOREIGN PATENT DOCUMENTS

EP 3376387 B1 8/2023

*Primary Examiner* — Madhu Woolcock
(74) *Attorney, Agent, or Firm* — Kilpatrick Townsend & Stockton LLP (57) ABSTRACT

A method may include receiving request data associated with a service, the request data in a first format. The method may also include determining an endpoint of the service and a second format associated with the service. The method may include generating a service request based at least in part on the request data, the service request in the second format. The method may then include providing the service request in the second format to an orchestrator. The method may include transmitting, by the orchestrator, the service request to the endpoint of the service. The method may include receiving, by the orchestrator, response data from the service, the response data based at least in part on the service request. The method may include generating, by the orchestrator, a response based at least in part on the response data. The method may include providing, by orchestrator, the response to the user.

17 Claims, 6 Drawing Sheets

(56) References Cited

U.S. PATENT DOCUMENTS

| | | | |
|---|---|---|---|
| 2008/0155067 A1* | 6/2008 | Rivera | H04L 63/0227 709/227 |
| 2010/0063992 A1* | 3/2010 | Ma | H04N 21/64322 709/203 |
| 2011/0041171 A1* | 2/2011 | Burch | H04L 63/20 709/229 |
| 2012/0011067 A1* | 1/2012 | Katzin | G06Q 20/40 709/219 |
| 2012/0209945 A1* | 8/2012 | Chandrasekhar | H04L 9/40 709/217 |
| 2014/0244809 A1* | 8/2014 | Kang | H04L 67/565 709/220 |
| 2016/0316016 A1* | 10/2016 | Arenas | H04L 67/01 |
| 2016/0337474 A1* | 11/2016 | Rao | H04L 41/12 |
| 2018/0359323 A1* | 12/2018 | Madden | H04L 12/4633 |
| 2021/0065179 A1* | 3/2021 | Batra | G06Q 20/027 |
| 2021/0089236 A1* | 3/2021 | Yang | G06F 3/0622 |
| 2023/0106091 A1* | 4/2023 | Shivashankara | G06F 9/541 719/328 |
| 2024/0406727 A1* | 12/2024 | Bhambani | H04W 12/08 |

* cited by examiner

USE OF CONNECTORS

BACKGROUND OF THE INVENTION

Solutions provided by vendors grow more complicated each day, with more entities and services involved in each solution. A request for a billing solution (or operation) may require responses from an invoicing service, a banking service, a payment-processing service, and more. Contacting each service individually may lead to long wait times for a response and/or a failure of the request based on just one of the services.

BRIEF SUMMARY OF THE INVENTION

A method may include receiving, by a proxy service of a computing system and from a user, request data associated with a service, the request data in a first format. The method may also include determining, by the proxy service of the computing system, an endpoint of the service. The method may include determining, by the proxy service hosted on the computing system, a second format associated with the service. The method may include generating, by the proxy service hosted on the computing system, a service request based at least in part on the request data, the service request in the second format. The method may then include providing, by the proxy service of the computing system, the service request in the second format to an orchestrator of the computing system. The method may include transmitting, by the orchestrator of the computing system, the service request to the endpoint of the service. The method may include receiving, by the orchestrator of the computing system, response data from the service, the response data based at least in part on the service request. The method may include generating, by the orchestrator of the computing system, a response based at least in part on the response data. The method may include providing, by orchestrator of the computing system, the response to the user.

In some embodiments, the request data may indicate that the service request was successfully fulfilled. The method may then include generating, by the orchestrator of the computing system, metadata indicating that the service request was successfully fulfilled. The method may also include storing, by the orchestrator of the computing system, the metadata indicating that the service request was successfully filled. In some embodiments, an application programming interface (API) may include a user interface to receive a request from the user according to the first format. The method may include configuring, by the computing system, the proxy service to generate the service request according to the second format.

In some embodiments, the method may also include receiving, by the computing system, second configuration data associated with a second service, the second configuration data indicating at least an endpoint of the second service and a third format. The method may then include determining, by the computing system, connectivity to the second service via the endpoint of the second service. In response to determining that the computing system has connectivity to the second service via the endpoint of the second service, the method may include updating, by the computing system and based on the second configuration data, the API to receive a second request from the user according to the third format. The method may then include configuring, by the computing system, the proxy service to generate a second service request according to the third format.

In some embodiments, the response data may indicate that the service request was not successfully processed. The method may then include generating, by the orchestrator of the computing system, metadata indicating that the service request was not successfully fulfilled. The method may then include storing, by the orchestrator of the computing system, the metadata indicating that the service request was successfully filled. The method may include transmitting, by the orchestrator of the computing system, the service request to the endpoint of the service according to a retry schedule.

In some embodiments, the proxy service may be configured to generate multiple service requests to respective services according to the request data. The computing system may include a cloud-based architecture on a public cloud-services provider. The service request may be transmitted to the service via a connector.

In some embodiments, a plurality of service requests may be provided to the orchestrator. The method may then include storing, by the orchestrator, the plurality of service requests in a queue table. The method may also include transmitting, by the orchestrator, each of the plurality of service requests to an associated service according to a time-based trigger. In some embodiments, the service request may be associated with a charging function of a standalone 5g network. In some embodiments, the request data is received from an API configured to generate the request data based on a user input.

A system may include one or more processors and a computer-readable, non-transitory memory. The memory may include instructions that, when executed by the one or more processors, cause the system to perform operations. According to the operations the system may receive, by a proxy service and from a user, request data associated with a service, the request data in a first format. The system may then determine, by the proxy service, an endpoint of the service and determine, by the proxy service, a second format associated with the service. The system may the generate, by the proxy service, a service request based at least in part on the request data, the service request in the second format. The system may also provide, by the proxy service, the service request in the second format to an orchestrator. The system may then transmit, by the orchestrator, the service request to the endpoint of the service. The system may receive, by the orchestrator, response data from the service, the response data based at least in part on the service request. The system may then generate, by the orchestrator, a response based at least in part on the response data and provide, by the orchestrator, the response to the user.

In some embodiments, the system may include a cloud-based architecture provided by a public cloud-services provider. The request data may indicate that the service request was successfully fulfilled. The system may perform further operations to generate, by the orchestrator, metadata indicating that the service request was successfully fulfilled. The system may then store, by the orchestrator, the metadata indicating that the service request was successfully filled. The system may receive configuration data associated with the service, the configuration data indicating at least the endpoint of the service and the second format. The system may then determine connectivity from the system to the service via the endpoint of the service. In response to determining that the system has connectivity to the service via the endpoint of the service, the system may generate based on the configuration data, an application programming interface (API,) where the API may include a user interface to receive a request from the user according to the first format. The system may then configure the proxy service to generate the service request according to the second format.

A non-transitory computer-readable medium may include instructions that, when executed by a processor, cause the processor to perform operations including receiving, by a proxy service of a computing system and from a user, request data associated with a service, the request data in a first format. The operations may include determining, by the proxy service of the computing system, an endpoint of the service. The operations may include determining, by the proxy service hosted on the computing system, a second format associated with the service. The operations may include generating, by the proxy service hosted on the computing system, a service request based at least in part on the request data, the service request in the second format. The operations may include providing, by the proxy service of the computing system, the service request in the second format to an orchestrator of the computing system. The operations may include transmitting, by the orchestrator of the computing system, the service request to the endpoint of the service. The operations may include receiving, by the orchestrator of the computing system, response data from the service, the response data based at least in part on the service request. The operations may include generating, by the orchestrator of the computing system, a response based at least in part on the response data. The operations may then include providing, by the orchestrator of the computing system, the response to the user.

In some embodiments, the operations may include receiving, by the computing system, configuration data associated with the service, the configuration data indicating at least the endpoint of the service and the second format. The operations may include determining, by the computing system, connectivity to the service via the endpoint of the service. The operations may include, in response to determining that the computing system has connectivity to the service via the endpoint of the service, generating, by the computing system and based on the configuration data, an application programming interface (API) where the API may include a user interface to receive a request from the user according to the first format. The operations may also include configuring, by the computing system, the proxy service to generate the service request according to the second format.

In some embodiments, the operations may include receiving, by the computing system, second configuration data associated with a second service, the second configuration data indicating at least an endpoint of the second service and a third format. The operations may include determining, by the computing system, connectivity to the second service via the endpoint of the second service. In response to determining that the computing system has connectivity to the second service via the endpoint of the second service, the operations may include updating, by the computing system and based on the second configuration data, the API to receive a second request from the user according to the third format. The operations may also include configuring, by the computing system, the proxy service to generate a second service request according to the third format. In some embodiments, the proxy service may be configured to generate multiple service requests to respective services according to the request data. The computing system may include a cloud-based architecture provided by a public cloud-services provider.

DETAILED DESCRIPTION OF THE INVENTION

A wireless network service may require a wireless network provider to provide several solutions to their customers. In a 5G service based architecture, these solutions may not be provided by the wireless network provider themselves, but rather provided wholesale by a backend service provider to several enterprise-level wireless network providers (sometimes "customers"). Furthermore, a solution may require several independent services to be accessed roughly simultaneously in order to perform the solution. While some of the enterprise-level service providers may utilize identical services, others may use completely different services to perform the solution. The result may be that the backend service provider may need to communicate with several enterprise-level network providers and even more services in order to provide solutions to the enterprise-level network providers. The complexity of providing solutions to the enterprise-level network providers therefore requires significant processing and time resources of the backend service provider.

One way to address some of these challenges may be to provide an application programming interface (API) to each customer for each service, by each service. For example, a customer may require a billing solution from the backend service provider. The billing solution may further require an invoicing service, a processing service, a banking service, a charging service, etc. Each of these services may provide a unique API to the backend service provider, who then provides the unique APIs to the customers accordingly. This solution poses its own issues, however. For example, an enterprise-level wireless provider may have thousands of their own customers, and need to perform thousands of billing functions per minute, day, etc. Each billing function may then require the enterprise-level wireless provider to access each API thousands of times and coordinate the responses from the various services in order to properly bill their customers. Because there are several services needed, a delay in one service's response to one request may cause disruptions not only in connection with the one request, but also to other requests made by the enterprise-level wireless provider. Responses may take seconds or minutes, and/or risk not being completed at all due to a failure of the one service. It may also be difficult or impossible to trace where the failure/delay happened.

Furthermore, because all of the services may have a unique API, the format of requests may be unique for each API. Instead of making a simple request such as "Bill amount $X to customer Y for service Z," the various components of the request may need to be parsed, formatted, and entered into the appropriate API. Likewise, the responses from each service may need to be stitched together in order to complete the request. Additionally, the resources needed to develop an API for each service for each customer may be significant. Any change in the customer's needs may also necessitate a new API, adding even more inefficiency. Thus, there is a need to develop a system for a backend service provider that efficiently generates an API for customers that accesses several services and coordinates requests and responses.

One solution may be to provide a single API per customer and/or per solution (e.g., a billing solution). The API may be configured to accept inputs from a customer for a request for a solution such as the billing solution. The API may then transmit the request to a proxy. The proxy may be hosted on a computing device and/or a cloud-based computing system. The proxy may determine one or more services that may be required to fulfil the request. The proxy may then parse information included in the request, and format portions of the request for the appropriate respective APIs. The proxy may then provide the request to a system including an orchestrator. The orchestrator may then coordinate the transmission of the portions of the request to the appropriate services, logging each portion of the request. As responses to the portions of the request are received, the orchestrator may then generate a response to provide to the customer.

The system described above may not only simplify the experience for the backend service provider's customers by having a single API but may also guarantee service and reduce response times. Furthermore, if a customer's needs change (e.g., by adding a new service), the system above may be quickly adapted to meet the new needs. For example, the backend service provider may only require an endpoint address and formatting information associated with the new service. An API may then be generated or updated (by a user and/or automatically) to accept information and generate a request using the formatting information associated with the new service. A proxy may then be generated or updated such that the request is transmitted to the new service using the endpoint address.

Although the systems and techniques described herein may refer to a specific type of provider or industry (e.g., a 5G service provider), it should be understood that the concepts and techniques are broadly applicable to many other industries and are also contemplated herein. Furthermore, any of the solutions and services described are merely examples; one of ordinary skill in the art would recognize many different possibilities.

Figure 1:
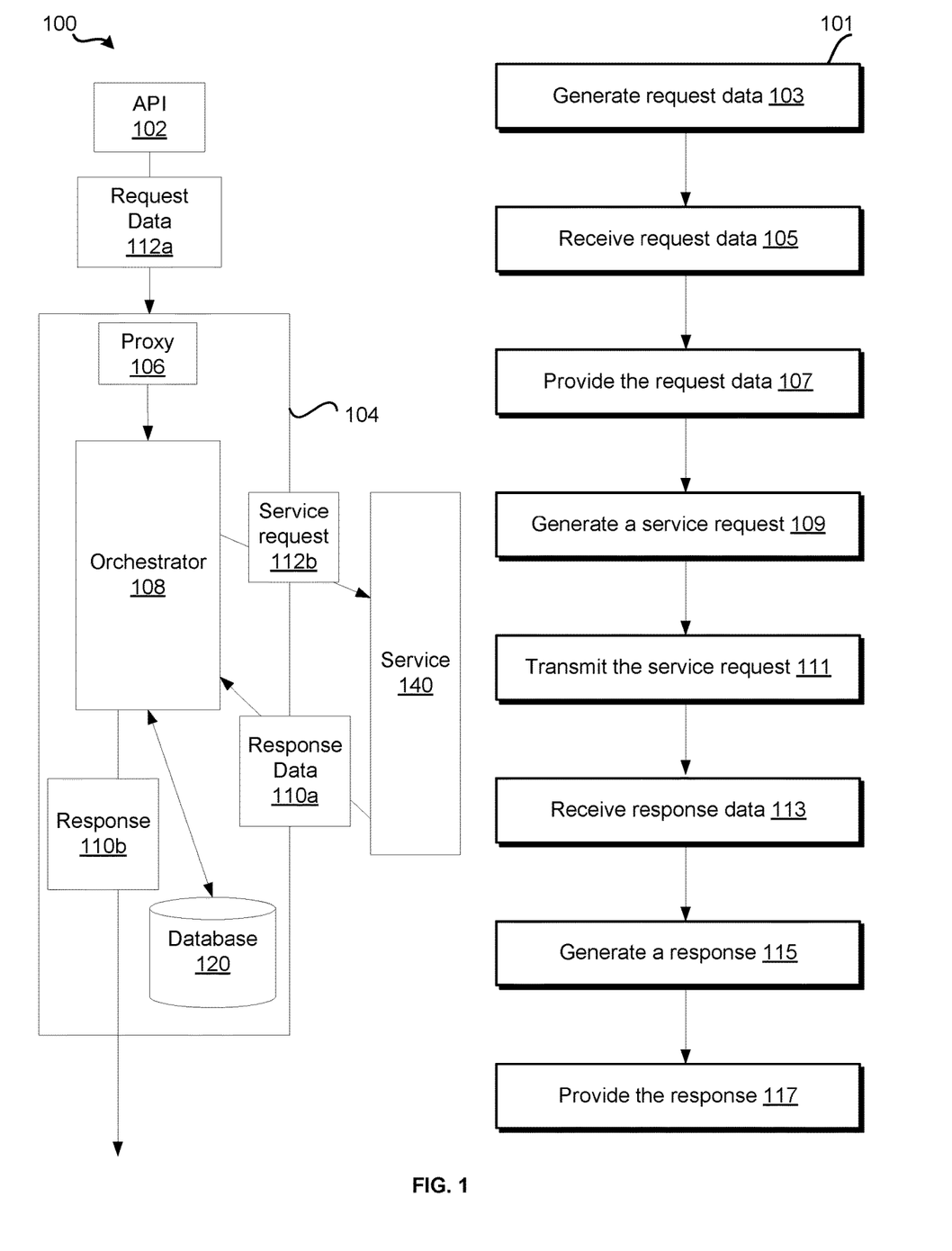
FIG. 1 illustrates a system and a process for fulfilling service requests, according to certain embodiments.

FIG. 1 illustrates a system 100 and a process 101 for fulfilling service requests, according to certain embodiments. The system 100 may include an API 102 and a computing system 104. The computing system 104 may include a proxy 106, an orchestrator 108, and a database 120. Some or all of the computing system 104 may be hosted on a single computing device or may be hosted by a cloud-services provider and thus be in a distributed cloud architecture. The system 100 may also be associated with a 5G service provider that provides various services to customers. The various services may include account management, billing, data/business insights, subscriber management, and other such solutions. Examples of customers may include mobile virtual network operators (MVNO), mobile virtual network enablers (MVNE), and other such entities. For example, an MVNO may provide wireless services to end users using at least some of the 5G service provider's equipment and/or solutions. The MVNO may utilize the 5G service provider's solutions to access an appropriate charging function (CHF) for the end users and bill the end users appropriately. One of ordinary skill in the art would recognize many different uses and possibilities.

Furthermore, the 5G service provider may access a third-party service 140 in order to perform the various services for a customer. In the case of a billing service provided to the customer, the third-party service 140 may include an invoicing service, a processing service, a CHF, etc. In some embodiments, the third-party service 140 may be associated with the 5G service provider (and therefore not truly be a third-party service).

The API 102 may be generated on a per-solution basis. The API 102 may also be associated with a particular customer. For example, the API 102 may be associated with a billing solution provided by the 5G service provider for an MVNO. There may be a similar API for another customer for a billing solution (or other solution). Additionally or alternatively, there may be a similar API for the same customer, but for another solution (e.g., account management).

At step 103, the API 102 may generate request data 112a, associated with a solution provided by (or via) the 5G service provider. The request data 112a may be generated in response to a user input from a user via the API 102. The request data 112a may include data for a third party service (e.g., the third-party service 140) to perform a service (e.g., a billing service). The data may be in a generic format, used for any API similar to the API 102, regardless of an associated solution or customer. The request data 112a may also indicate an endpoint associated with the third-party service 140. The endpoint may be a private endpoint within a private network, a public internet protocol address (IP), or any other suitable endpoint.

At step 105, the proxy 106 may receive the request data 112a. The proxy 106 may determine that the endpoint indicated in the request data 112a is associated with the third-party service 140. The proxy 106 may also determine a format needed by the third-party service 140. The proxy 106 may then determine at least a portion of the request data 112a associated with the third-party service 140 and reformat the portion of the request data 112a into the format needed by the third-party service 140. In some embodiments, the request data 112a may indicate multiple third-party services. The proxy 106 may then reformat the portions of the request data 112a as needed by each of the multiple third-party services.

At step 107, the proxy 106 may provide the request data 112a to the orchestrator 108. Each portion of the request data 112a provided to the orchestrator 108 may be reformatted from the generic format to a format necessary for an associated third-party service (e.g., the third-party service 140). The orchestrator 108 may include one or more components (including software and/or software) configured to coordinate the transmission of requests and responses to various third-party services. The orchestrator 108 may also communicate with the database 120 to coordinate the transmission of requests and responses. For example, the orchestrator 108 may include various processing functions to parse the request data 112a and schedule the transmission of requests based on the request data 112a to the appropriate third-party service. The database 120 may, in turn, log activity associated with each request. In some embodiments, the database 120 may be a dynamic database, capable of processing data and sending processed data to the orchestrator 108.

At step 109, the orchestrator 108 may generate a service request 112b. The service request 112b may be based at least in part on the request data 112a. For example, only a portion of the request data 112*a* may be associated with the third-party service 140. The orchestrator 108 may then generate the service request 112*b* based only on the portion. In embodiments where the request data 112*a* includes data associated with multiple third-party services, the orchestrator 108 may generate a service request for each of the multiple third-party services.

At step 111, the orchestrator 108 may transmit the service request 112*b* to the third-party service 140. The orchestrator 108 may transmit the service request 112*b* via a connector. The connector may be a piece of software or code that connects to and interacts with a destination system. For example, a connector included in the system 100 may be configured to transmit service requests to the third-party service 140 without processing data any further. Thus, in systems involving multiple third-party services, there may be an equal number of connectors. To do so, the connector may connect the system 100 to the third-party service 140 via Hypertext Transfer Protocol (HTTP) or any other suitable protocol.

At step 113, the orchestrator 108 and/or the database 120 may receive response data 110*a* from the third-party service 140. The response data 110*a* may be in a format native to the third-party service 140. In some embodiments, the database 120 may receive the response data 110*a* and update one or more logs to indicate that a response has been received from the third-party service 140.

At step 115, the orchestrator 108 may generate a response 110*b*, based at least in part on the response data 110*a*. To generate the response 110*b*, the orchestrator 108 may reformat the response data 110*a* into the generic format (e.g., the generic format of the request data 112*a*). In embodiments where multiple third-party services are involved, the orchestrator 108 may generate the response using response data from each of the third-party services. If there is a delay or failure from one of the multiple third-party services, the orchestrator 108 may not generate the response 110*b*. Instead, the orchestrator 108 may retransmit the associated service request to the appropriate third-party service according to a retry schedule (e.g., retry two times before creating a failure message).

The orchestrator 108 may also generate a log including metadata associated with the response 110*a*. The metadata may include information about the request 112*b* and the response 110*b*, such as a response status (e.g., error, failure, success), a response time, an error cause, a failure cause, and other such metadata. The metadata may be stored at the database 120 or may be stored in a different database.

At step 117, the orchestrator 108 may cause the response 110*b* to be provided to the user. The response 110*b* may be provided via the API 102. Once the orchestrator 108 provides the response 110*b*, the orchestrator 108 may cause one or more records associated with the request data 112*a*, the request 112*b*, the response data 110*a*, and the response 110*b* to be deleted from the database 120. The orchestrator 108 may also generate additional metadata and/or modify the existing metadata.

Both the system 100 and the process 101 are illustrated as a simplified overview of some of the systems and techniques described herein. The system 100 may include more or less components than are illustrated. Similarly, the process 101 may include steps not described and/or additional steps. Some of the steps may also be combined into a single step.

Figure 2:
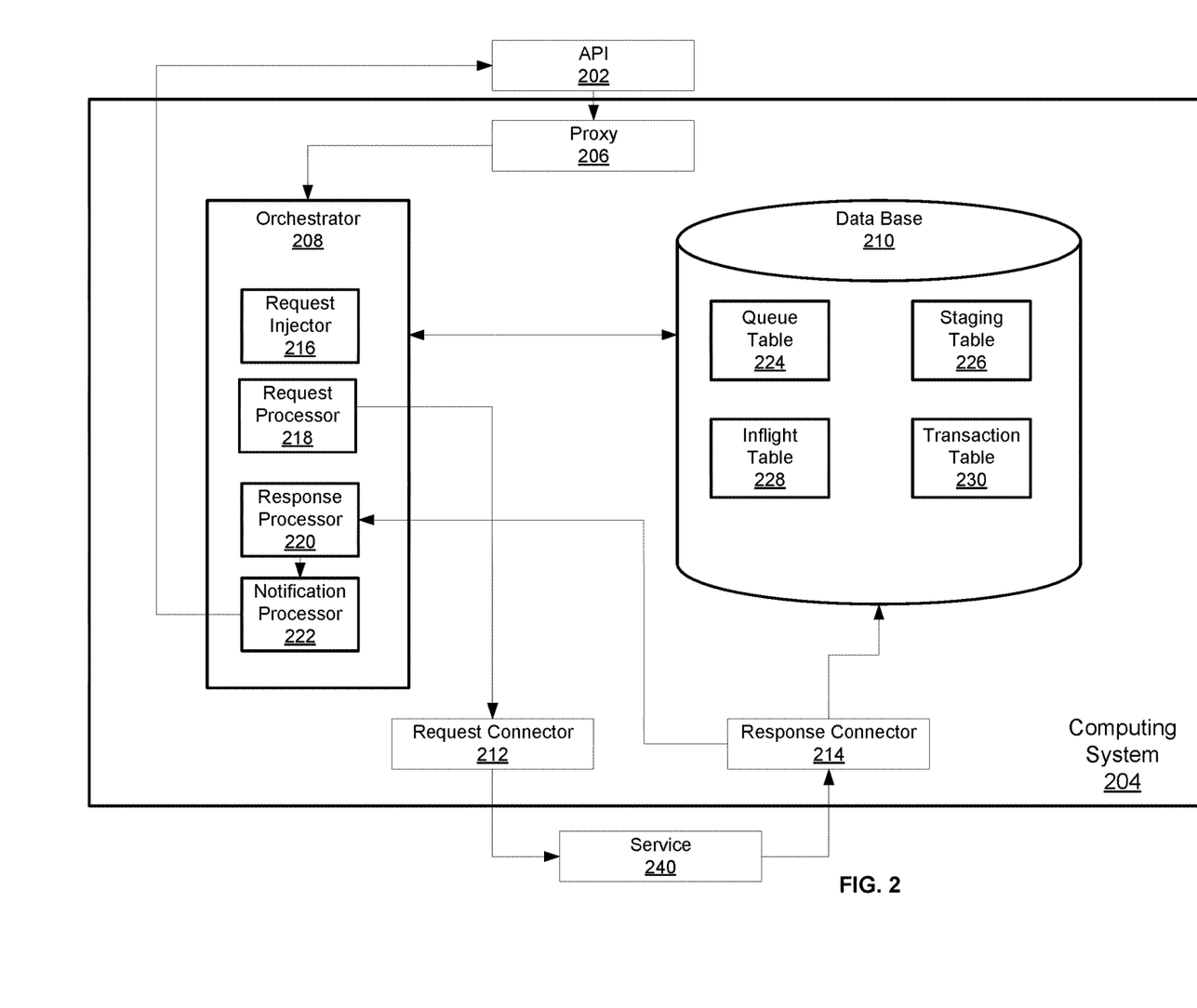
FIG. 2 illustrates a diagram of a system for providing solutions using connectors, according to certain embodiments.

FIG. 2 illustrates a diagram of a system 200 for providing solutions using connectors, according to certain embodiments. The system 200 may be similar to the system 100 in FIG. 1 and have similar components and functionalities. The system 200 may include an API 202 and a computing system 204. The computing system 204 may be a single computing device or may be multiple computing devices in a distributed cloud system. The computing system 204 may be hosted on a private cloud network and/or a public cloud service. The computing system 204 may include a proxy 206, an orchestrator 208, a database 210, a request connector 212, and a response connector 214. The orchestrator 208 may further include a request injector 216, a request processor 218, a response processor 220, and a notification processor 222. Some or all of the components included in the orchestrator 208 may include hardware and/or software components configured to perform the processes and techniques described herein. The database 210 may include a queue table 224, a staging table 226, an inflight table 228, and a transaction table 230.

The API 202 may be similar to the API 102 in FIG. 1. The API 202 may be configured such that a 5G service provider may provide a solution (e.g., a billing solution) to a specific customer. Therefore, the system 200 may include a plurality of API's each associated with a solution for a particular customer. In some embodiments, however, the specific customer may access the API 202 for multiple solutions (e.g., for billing and account management solutions). The API 202 may be implemented as part of the computing system 204 or may be implemented on a separate computing device.

The proxy 206 may be configured to accept request data such as the request data 112*a* for a particular solution (e.g., a billing solution). The proxy 206 may accept request data from multiple APIs. In other words, the proxy 206 may be configured to accept requests from multiple customers for similar solutions. For example, a first customer may utilize the 5G service provider for a billing solution requiring a first set of third-party services. A second customer may also utilize the 5G service provider for a billing solution using a second set of third-party services. While there may be overlap between the first and second sets of third-party services, each set may include unique services. In either case, the proxy 206 may determine the necessary formatting and endpoints for any third-party service required by any associated API (e.g., the API 202).

The 5G service provider may provide multiple solutions to its customers, however. Thus, there may be several proxies similar to the proxy 206, configured to accept request data for other solutions (e.g., account management, data insights services, subscriber management, etc.). Furthermore, identical instances of the proxy 206 may be instantiated on the computing system 204. A load balancer or other such component may direct incoming request data to one of the identical instances to better manage traffic flow and efficiency.

As described in FIG. 1, the proxy 206 may parse the incoming request data, determining one or more third-party services needed to fulfill the request successfully. In doing so, the proxy 206 may reformat the request data as needed by a particular third-party service and determine an endpoint thereof. In relation to FIG. 2, some portion of the incoming request data may be associated with the third-party service 240. The portion may then be provided to the orchestrator 208. The orchestrator 208 may utilize the portion to generate a request for the third-party service 240 via the request processor 218.

The request processor 218 may then cause the request injector 216 to transmit data to the database 210. The data may cause an entry to be created in the transaction table 230. The transaction table 230 may include information associated with one or more transactions in process or completed.

For example, the transaction table 230 may include a transaction identifier (ID) associated with the request. The transaction table 230 may also include information regarding a status of the request (e.g., inflight, completed, etc.). The transaction ID may be transmitted to the orchestrator 208 (e.g., to the request processor 218 or to another component of orchestrator 208). The data may also cause an entry to be created in the queue table 224. The queue table 224 may include data associated with one or more requests such as a time the request was received, an importance level, etc.

In some embodiments, multiple requests may be needed, according to the request data received by the proxy 206 from the API 202. The request processor 218 may therefore generate the multiple requests. The queue table 224 may include entries associated with all of the multiple requests. The transaction table 230 may also include entries associated with all of the multiple requests, but those entries may include a single transaction ID. In other embodiments, each request may have a separate transaction ID. Other data may then link the multiple requests with the request data (and the API 202).

After the request is generated by the request processor 218 and injected into the queue table 224 and the transaction table 230 by the request injector 216, the request processor 218 may transmit the request to the request connector 212. The request processor 218 may transmit the request based on a time-based trigger, an importance level of the request, or any other suitable trigger. The request processor 218 may then cause the database 210 to be updated. For example, the update may cause the entry in the queue table 224 to be removed and an entry generated in the inflight table 228. The inflight table 228 may include entries associated with one or more requests that have been transmitted by the orchestrator 208 but have not had a response returned yet.

The request connector 212 may then transmit the request to the third-party service 240. The request connector 212 may provide a connection between the computing system 204 (and components thereof) and/or the API 202 to the third-party service 240. The system 204 may include a number of connectors equal to the number of third-party service providers (in embodiments, where multiple third-party services are used).

The third-party service 240 may process the request transmitted by the computing system 204 via the request connector 212. The third-party service 240 may then transmit response data associated with the request to the computing system via the response connector 214. In some embodiments, the response connector 214 and the request connector 212 may be the same component. In other embodiments, the response connector 214 and the request connector 212 may be different components.

The response connector 214 may then transmit the response data to the response processor 220 and/or the database 210. The database 210 may update one or more of the tables included in the database 210. For example, if the response data indicates that the response was successfully fulfilled, the entry associated with the request may be removed from the inflight table 228 and an entry created in the staging table 226. If the response data indicates that the request failed or contained an error, the entry in the inflight table 228 may be modified to indicate that the request was resent or will be resent. The transaction table 230 may be updated to reflect the status of the request according to the response data in either case.

The staging table 226 may include a record of one or more requests associated with sets of request data. For example, if the proxy 206 receives request data from the API 202 that requires multiple requests from multiple third-party services, a request back to the API 202 may not be generated until response data are received for all of the multiple requests. Because each third-party service may return its own response data, the response data needed to generate the response may not be received by the computing system 204 at the same time. Therefore, the staging table 226 may create entries of response data as the response data is received by the computing system 204, associating the response data with a single request, as appropriate.

After the response data needed to generate a response is received from the third-party service 240, the database 210 (e.g., the staging table 226) may transmit some or all of the response data to the response processor 220. In some embodiments, the response may be generated by the staging table 226 and/or another component included in the database 210. In other embodiments, the database 210 may cause the response data to be transmitted to the response processor 220. Once the response data is transmitted to the response processor 220, the entries associated with the response data may be removed from the staging table 226. The transaction table 230 may then be updated to indicate that the request data has been transmitted to the response processor 220.

The response processor 220 may generate the response based at least in part on the response data received from the database 210. Generating the response may include reformatting the response data into a generic format (as may be used by the API 202). Additionally or alternatively, generating the response may include determining metadata associated with the request/response. For example, the metadata may include information about the request and the response, such as a response status (e.g., error, failure, success), a response time, an error cause, a failure cause, and other such metadata. The metadata may be stored at the database 210 or may be stored in a different database. Once the response is generated, the notification processor 222 may transmit the response to the user via the API 202.

Figure 3:
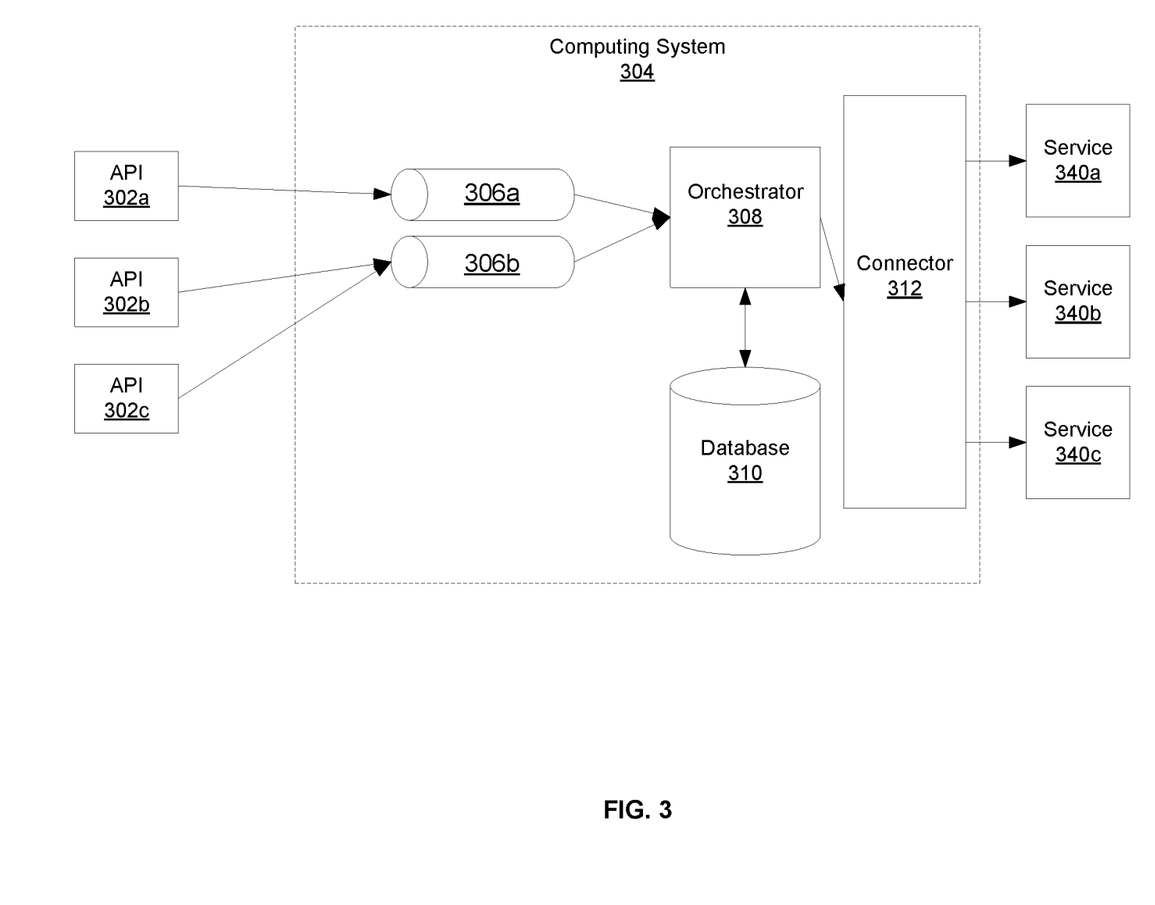
FIG. 3 illustrates a system for providing solutions via multiple application programming interfaces using connectors, according to certain embodiments.

FIG. 3 illustrates a system 300 for providing solutions via multiple application programming interfaces using connectors, according to certain embodiments. The system 300 may be similar to the system 200 in FIG. 2, and therefore include similar components and functionalities. The system 300 may include APIs 302a-c, a computing system 304, proxies 306a-b, an orchestrator 308, a database 210, and a connector 312. The system 300 may be configured to provide various solutions to customers using third-party service 340a-c.

The API's 302a-c may be similar to the API 202 and be configured for a specific customer and/or solution. For example, the API 302a may be configured for a first customer to access a billing solution. The API 302b may be configured for the first customer to access an account management solution. The API 302c may be configured for a second customer to access another account management solution.

The proxy 306a may be configured to receive request data from the API 302a, the request data associated with the billing solution. The proxy 306a may therefore parse the request data to determine a format needed by any third-party services needed to fulfil the request (e.g., the third-party services 340a-b). The proxy 306b may be configured to receive request data from the APIs 302a-b, the request data associated with the account management solution. The proxy 306b may therefore determine a format needed by the third-party service needed to fulfil the request (e.g., the third-party service 340c).

The orchestrator 308 may receive request data from the proxies 306a-b. Similar to the orchestrator 208 in FIG. 2, the orchestrator 308 may generate requests based on the request data. The orchestrator 308 may communicate with the database 310 to coordinate the transmission of the requests and the responses received from the third-party services 340a-c. For example, in the example above, the request data received from the API 302a may require response data from the third-party services 340a-b. The orchestrator 308 may then parse the request data such that a first request is generated to be transmitted to the third-party service 340a, and a second request is generated to be transmitted to the third-party service 340b. When respective response data is received from the third-party services 340a-b, the orchestrator 308 may generate a response based on the respective response data from each third-party service 340a-b and transmit the response back to the API 302a.

Similarly, the orchestrator 308 may generate requests based upon request data received from the APIs 302b-c. The APIs 302b-c may be associated with the same customer (e.g., two instances of the same API), or may be associated with the same customer. Each respective set of request data may require response data from the third-party service 340c. The orchestrator 308 may therefore communicate with the database 310 to coordinate the transmission and reception of the requests and response data to and from the third-party service 340c. The orchestrator 308 may generate the responses to the appropriate API 302b-c.

In some embodiments, the connector 312 may be configured to communicate with all of the third-party services 340a-c. In other embodiments, each of the third-party services 340a-c may have an associated connector, similar to the connector 312. Thus, although only one connector 312 is shown, there may be an equal number of connectors to the number of third-party services.

Figure 4:
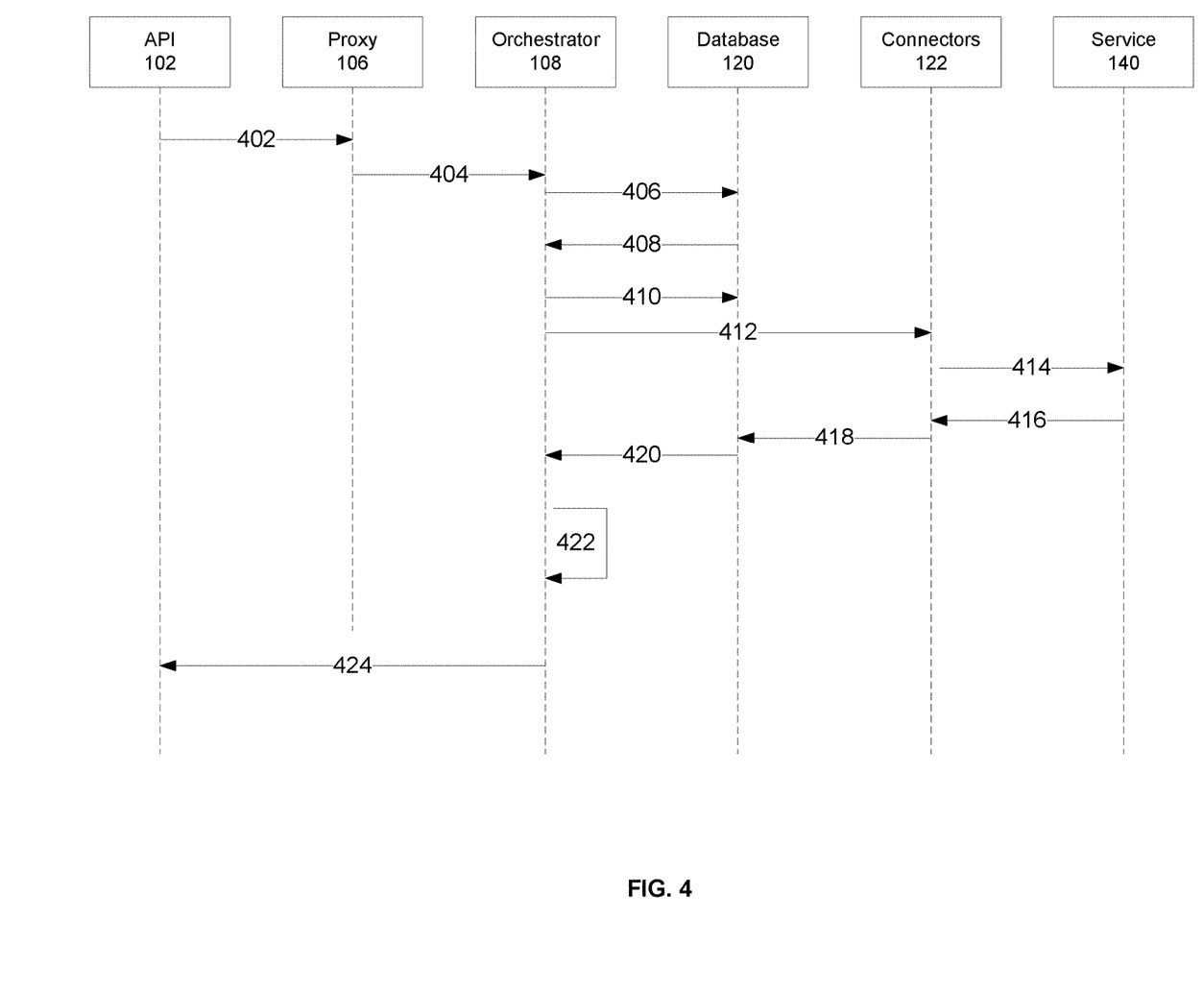
FIG. 4 is a diagram of a workflow of a system for providing solutions using connectors, according to certain embodiments.

FIG. 4 is a diagram of a workflow 400 of a system for providing solutions using connectors, according to certain embodiments. The system may be similar to the systems 100, 200, and/or 300 as described in relation to FIGS. 1, 2, and 3, respectively. Thus, although components of the system shown in FIG. 4 may correspond to FIG. 1, the workflow 400 may be similar using any of the systems described herein. The system may include the API 102, the proxy 106, the orchestrator 108, the database 120, connectors 122, and the third-party service 140.

At 402, the API 102 may transmit request data to the proxy 106. The request data may be associated with a solution provided by a back-end service provider (e.g., a 5G service provider) to a customer. The request data may be in a format native to the API 102 and include data needed by multiple third-party services to complete the request, such as the third-party service 140. The request data may also include an endpoint associated with any third-party services needed to complete the request.

At 404, the proxy 106 may determine information regarding the request from the request data such as formatting and destination, associated with the third-party service 140. The proxy 106 then forwards the request data including the information to the orchestrator 108. At 406, the orchestrator 108 may cause the database 120 to add an entry to a queue table (e.g., the queue table 224) and a transaction table (e.g., the transaction table 230) associated with the request data. The orchestrator 108 may also generate a request from the request data, such that the request is formatted correctly for the third-party service 140.

At 408, the database 120 may return a transaction ID associated with the request to the orchestrator 108. The transaction ID may be used by various components of the orchestrator 108 to process request data and/or response data, including generating requests and responses. At 410, the orchestrator 108 may cause the database 120 to delete the entry associated with the request from the queue table and generate an entry in an inflight table (e.g., the inflight table 226). The database 120 may also update the transaction table to include the status of the request (e.g., in process).

At 412, the orchestrator 108 may transmit the request to the connectors 122. The connectors 122 may be associated with the third-party service 140 that enables communication from a computing system (e.g., the computing system 204) and/or the API 102 to the third-party service 140. At 414, the connectors 122 may transmit the request to the third-party service 140. The connectors 122 may be associated with the third-party service 140 and may include a first connector configured to transmit requests and a second connector configured to receive response data. In some embodiments, the connectors 122 may be a single connector, configured to both transmit requests and receive response data.

At 416, the connectors 122 may receive response data from the third-party service 140. The response data may be in a format native to the third-party service. At 418, the connectors 122 may transmit the request data to the database 120. Using the request data, the database 120 may remove the entry associated with the request from the inflight table. The database 120 may also generate an entry in a staging table (e.g., the staging table 228). The database 120 may also update the transaction table to show that at least a portion of the response data needed to complete the request has been received.

At 420, the database 120 may transmit the request data to the orchestrator 108 (e.g., to a response processor). In some embodiments, there may be multiple sets of request data received from multiple third-party services needed to complete the request. The database 120 may not transmit any of the request data to the orchestrator until all necessary request data has been received. In other embodiments, the database 120 may transmit each set of request data to the orchestrator 108 as it is received.

At 422, the orchestrator 108 may generate the response based at least in part on the response data, via the response processor. The orchestrator 108 may reformat some or all of the request data into a format used by the API 102 or another format. For example, if sets of request data are received from multiple third-party services such as the third-party service 140, each set of request data may be in a different format. The orchestrator 108 may therefore reformat the response data into a single format to generate the response.

At 424, the orchestrator 108 may provide the response via the API 102. In some embodiments, the orchestrator 108 may provide the response without the API 102, such as directly to a user device.

Figure 5:
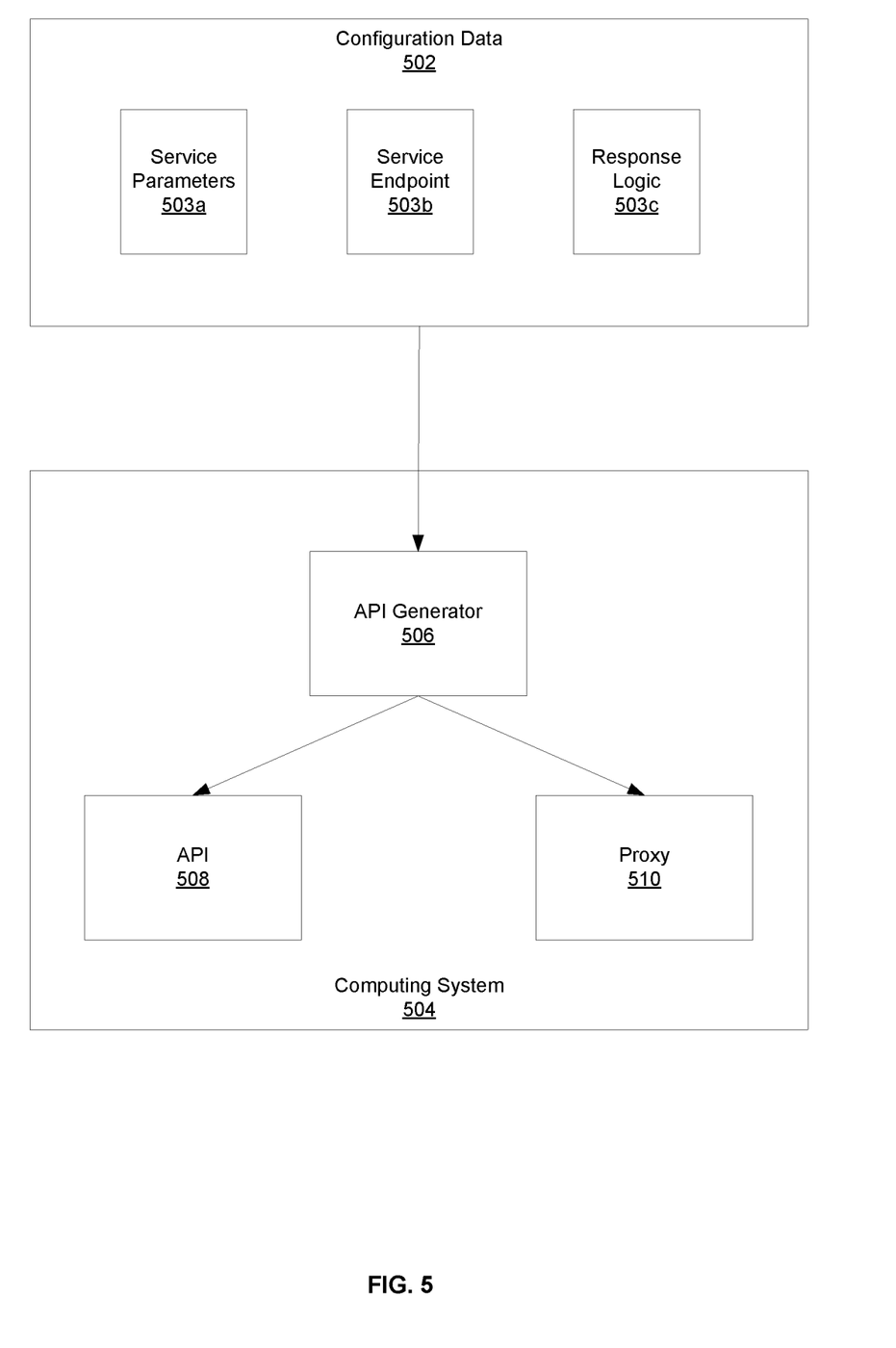
FIG. 5 illustrates a system for creating an API and a proxy, according to certain embodiments.

FIG. 5 illustrates a system 500 for creating an API 508 and a proxy 510, according to certain embodiments. The system 500 may be included in the systems 100, 200, and/or 300 in FIGS. 1, 2, and 3 respectively or may be a separate system altogether. The system 500 may include a computing system 504 with an API generator 506. The computing system 504 may be a single computing device or may be a distributed system (e.g., a cloud-based system). In some embodiments, the computing system 504 may be a component of a system such as the system 200 in FIG. 2.

The computing system 504 may be associated with a back-end service provider such as a 5G service provider. As such, the back-end service provider may have several customers that require new solutions and/or access to third-party services in order to utilize the solutions. However, using some or all of other systems described herein (e.g., the system 200), the APIs and proxies may be generated quickly, reducing a need for human programming in the creation of the APIs and proxies. For example, in relation to FIG. 2, all requests for any solution may be handled by the orchestrator 208. The orchestrator 208 may only need to know an endpoint of each third-party service needed to fulfill the requests; the orchestrator 208 may not need to know anything else about the requests. In effect, any new API like the API 202 may simply need to receive input associated with a solution and/or a customer, while the proxy 206 may simply need to direct the request to the orchestrator 208 with the appropriate endpoint attached to portions of the request data from the API 202. Thus, configuring a new API and a new proxy may require relatively little information.

Returning to FIG. 5, configuration data 502 may be provided to the API generator 506. The configuration data 502 may be provided by a customer of the back-end service provider through a graphical user interface (GUI) or another appropriate interface. The configuration data 502 may include service parameters 503a, service endpoint 503b, and response logic 503c. The service parameters 503a may include a data format needed by a third-party service, identify a portion of request data to be transmitted to the third-party service, and include a retry schedule. The retry schedule may include a threshold of retries in the event that a response from the third-party service in response to a service request includes an error or failure message (e.g., retry 3 times, 5 times, etc.). For example, a request may include multiple sets of request data associated with different third-party services. A service request based on a first set of request data may return response data including an error or failure message. According to the service parameters 503a, the service request may be retransmitted to before a failure response is returned in response to the request. In other words, a failure response may not be returned to a requestor just because a component of the request failed.

The service endpoint 503b may include an IP address or other such routing information, associated with portions of request data. Thus, the orchestrator 208 may determine the address associated with a third-party service associated with each portion of request data using the service endpoint(s) 503b. The response logic 503c may include data, including an expected response format and instructions on how to format response data according to the expected response format.

Using the configuration data 502, the API generator 506 may then verify connectivity to the third-party service via the service endpoint. Verifying connectivity may include not only verifying the accuracy of the service endpoint 503b, but also any permissions, credentials, etc. needed to access third-party service. Upon verifying the connectivity, the API generator may create the API 508 and/or the proxy 510. In some embodiments, the API generator 506 may modify an existing API and/or proxy to include the configuration data 502. Based on the configuration data 502, the API 508 may be associated with a customer of a back-end service provider (e.g., a 5G service provider) in order to provide access to solutions enabled by the back-end service provider (e.g., a billing solution, account management solution, etc.).

Similarly, the proxy 510 may be associated with the customer and/or the solution. In some embodiments, the proxy 510 may be configured to accept input (e.g., request data) from multiple APIs associated with a single customer but multiple solutions. In other embodiments, the proxy 510 may be configured to accept input from a single API associated with the customer but multiple solutions. In still other embodiments, the proxy 510 may be configured to accept input from multiple APIs associated with multiple customers but a single solution. One of ordinary skill in the art would recognize many different possibilities.

Figure 6:
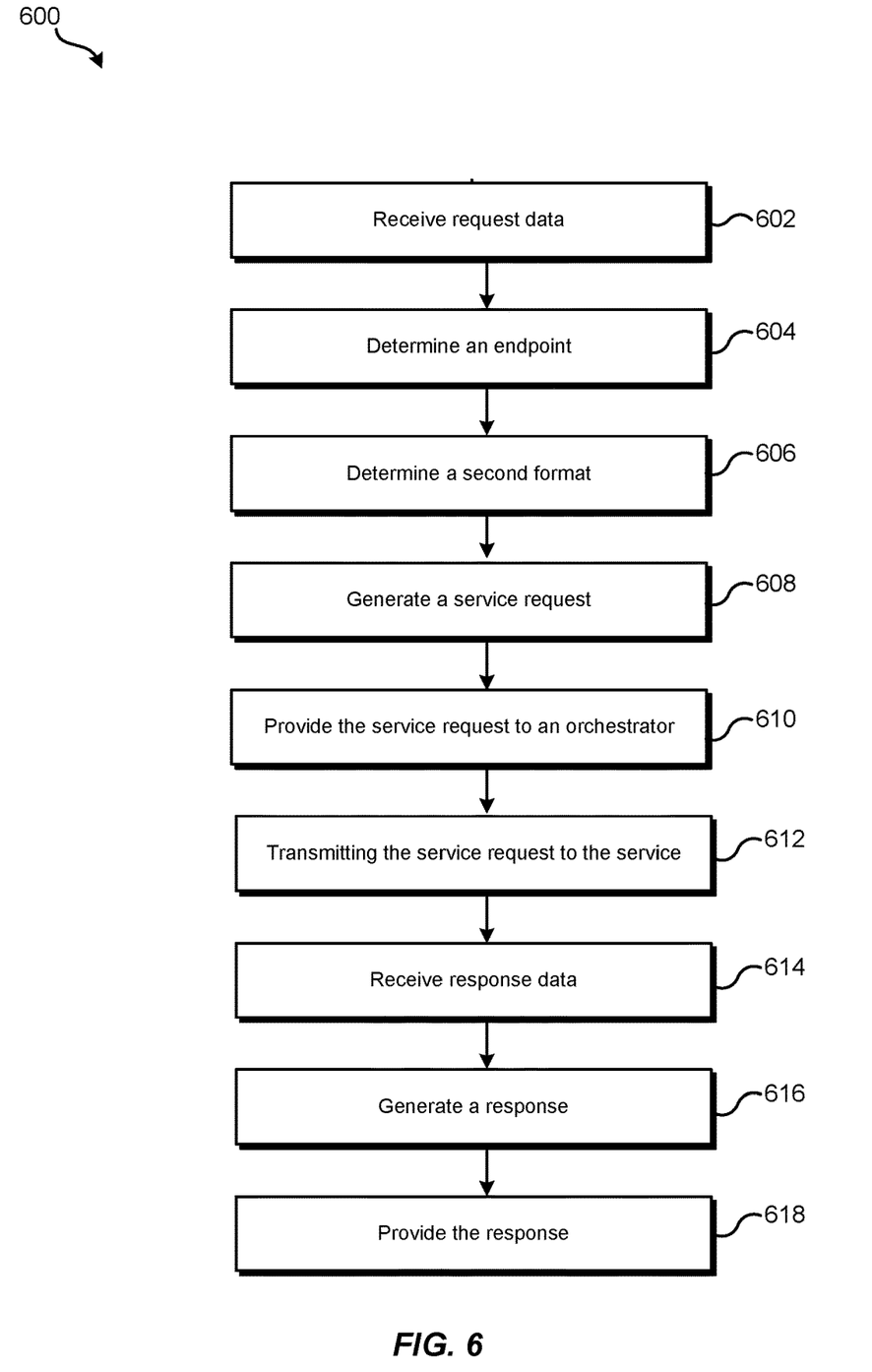
FIG. 6 illustrates a flowchart of a method for providing solutions using connectors, according to certain embodiments.

FIG. 6 illustrates a flowchart of a method 600 for providing solutions using connectors, according to certain embodiments. The method 600 may be performed by one or more of the systems 100, 200, and/or 300 in FIGS. 1-3, respectively. The steps of the method 600 described below may be performed in a different order than is presented, may be combined in whole or in part, and/or may be skipped altogether.

At step 602, the method 600 may include receiving, by a proxy service of a computing system and from a user, request data associated with a service. The request data may be in a first format. In some embodiments, the request data may be at least of a portion of a request for a solution provided via an API. The API may be associated with a customer of a back-end service provider such as a 5G service provider and configured to accept user input and generate request data. The first format may be associated with the API. The computing system may be a cloud-based computing system, hosted by a public cloud provider. The proxy service may be similar to the proxy 206 in FIG. 2. The proxy service may be associated with the customer and/or the solution. The service may be a third-party service, such as the third-party service 140 in FIG. 1.

At step 604, the method 600 may include determining, by the proxy service, an endpoint of the service. The endpoint may include an IP address and/or other routing information associated with the service. At step 606, the method 600 may include determining, by the proxy service, a second format associated with the service. The second format may be provided to the proxy service via configuration data such as the configuration data 502 in FIG. 5.

At step 608, the method 600 may include generating, by the proxy service, a service request. The service request may be based at least in part on the request data (including the endpoint) and be in the second format. The service request may be associated with the service (e.g., the charging function of a standalone 5G network). The service request may be one of multiple service requests generated in response to the request data. For example, a customer may enter a request for a billing solution via the API. To fulfill the request, multiple third-party services may be required to respond to the request (e.g., an invoicing service, payment service, etc.). Thus, the proxy service may generate a service request for each respective third-party service using relevant portions of the request data. Each service request may also be formatted correctly for the corresponding third-party service.

At step 610, the method 600 may include providing, by the proxy service, the service request to an orchestrator of the computing system. The orchestrator may be similar to the orchestrator 208 in FIG. 2. The orchestrator may operate in conjunction with a database such as the database 210 to perform various operations. The database may be a dynamic database. In some embodiments, a plurality of service requests may be provided to the orchestrator. The orchestrator may cause entries associated with each of the plurality of service requests to be stored in a queue table.

At step 612, the method 600 may include transmitting, by the orchestrator, the service request to the service via the endpoint. In transmitting the service request, the orchestrator may cause one or more tables to be updated in the database, as is described in FIG. 2. A connector may provide a connection between the computing system and the service. Thus, the orchestrator may transmit the service request to the service via the connector. Continuing the example of the plurality of service requests, the orchestrator may transmit each of the plurality of service requests to an associated service based on a time-based trigger, an importance level of each of the service requests, and/or other parameters.

At step 614 the method 600 may include receiving, by the orchestrator, response data from the service. The response data may be based on the service request and be received via the connector (or a second connector). Additionally or alternatively, the response data may be received by the database 210.

In some embodiments, the response data may indicate that the service request was successfully fulfilled. The orchestrator may then generate metadata indicating that the service request was successfully fulfilled. The metadata may then be stored and subsequently accessed to update one or more parameters of the systems described herein. In other embodiments, the response data may indicate that the service request was not successfully fulfilled. Then, the orchestrator may generate metadata indicating that the service request was not successfully fulfilled. The metadata may then be stored and subsequently accessed to update one or more parameters of the systems described herein. The orchestrator may then retransmit the service request to the service via the endpoint according to a retry schedule before generating a failure response associated with the entire request.

At step 616, the method 600 may include generating, by the orchestrator, a response based at least in part on the response data. For example, the response may require response data from multiple services. The orchestrator may reformat some or all of the response data to generate the response, such that the response includes the response data necessary to respond appropriately to the user. If some of the response data from one of the multiple services includes a failure or error message, the service request associated with that response data may be retransmitted to the appropriate service. The orchestrator may not generate the response until the service request is successfully fulfilled.

At step 618, the method 600 may include providing, by the orchestrator of the computing system, the response to the user. The response may be provided via the API or by any other suitable method. The orchestrator may cause any entries associated with the request data, service request, response data, and response to be removed from the database. The orchestrator may also update the metadata to reflect that the response has been provided.

In some embodiments, the method may also include receiving, by the computing system configuration data associated with the service. The configuration data may be similar to the configuration data 502 in FIG. 5 and be received by an API generator similar to the API generator 506. The configuration data may include the endpoint of the service and the second format (associated with the service). The computing system may then determine connectivity to the service via the endpoint of the service. Determining connectivity may include verifying the accuracy of the endpoint as well as any credentials needed to access the service.

In response to determining that the computing system has connectivity to the service via the endpoint, the computing system may then generate an API based at least in part on the configuration data. The API may include a user interface (e.g., a GUI) to receive a request from the user according to the first format. The API may also be configured to parse the request into the request data. The computing system may then configure the proxy service to generate the service request according to the second format. In some embodiments, the computing system may generate a new proxy service based at least in part on the configuration data.

In some embodiments, the method may also include receiving, by the computing system, second configuration data associated with a second service. The second configuration data may indicate an endpoint of the second service and a third format (associated with the second service). The computing system may then determine connectivity to the second service via the endpoint of the second service, as described above. In response to determining that the computing system has connectivity to the second service, the computing system may update the API to receive a second request from the user according to the third format. In some embodiments, the computing system may generate a second API based on the second configuration data. The computing system may then configure the proxy service to generate a second service request according to the third format.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. A method, comprising:
receiving, by a proxy service of a computing system, request data generated in response to an input from a user, the request data in a first format;
determining, by the proxy service, a plurality of services used to process two or more respective portions of the request data;
for each of the two or more portions of the request data:
determining, by the proxy service, an endpoint of a service of the plurality of services, the service associated with the respective portion of the request data;
determining, by the proxy service, a native format associated with the respective service; and
forwarding, by the proxy service to an orchestrator of the computing system, data including the respective portion of the request data, and indicating the endpoint of the service, and the native format;
generating, by the orchestrator, a respective service request based on the respective portion of the request data according to the native format;
transmitting, by the orchestrator, the respective service request to the endpoint of the respective service;
generating, by the orchestrator, a record of the respective service request in a staging table;

receiving, by the orchestrator, respective response data from the respective service, the respective response data based at least in part on the respective service request and according to the native format; and updating, by the orchestrator, the record in the staging table to include the respective response data;

determining, by the orchestrator, that the orchestrator has received respective response data from each of the plurality of services; and in response to determining that the orchestrator has received respective response data from each of the plurality of services:

generating, by the orchestrator, a single response in the first format including the respective response data associated with each of the respective plurality of service requests; and providing, by the orchestrator, the single response to the user.

2. The method of claim 1, further comprising:

receiving, by the computing system, configuration data associated with a first service of the plurality of services, the configuration data indicating at least an endpoint of the first service and a second format;

determining, by the computing system, connectivity to the first service via the endpoint of the first service;

in response to determining that the computing system has connectivity to the first service via the endpoint of the first service:

generating, by the computing system and based on the configuration data, an application programming interface (API) wherein the API comprises a user interface to receive a request from the user according to the first format; and configuring, by the computing system, the proxy service to generate a first service request according to the second format.

3. The method of claim 2, further comprising:

receiving, by the computing system, second configuration data associated with a second service of the plurality of services, the second configuration data indicating at least an endpoint of the second service and a third format;

determining, by the computing system, connectivity to the second service via the endpoint of the second service; and in response to determining that the computing system has connectivity to the second service via the endpoint of the second service:

updating, by the computing system and based on the second configuration data, the API to receive a second request from the user according to the third format; and configuring, by the computing system, the proxy service to generate a second service request according to the third format.

4. The method of claim 1, wherein when the respective response data indicates that the respective service request was not successfully processed, the method further comprising:

updating, by the orchestrator of the computing system, the staging table to indicate that the respective service request was not successfully fulfilled;

transmitting, by the orchestrator of the computing system, the respective service request to the endpoint of the respective service according to a retry schedule.

5. The method of claim 1, wherein the computing system comprises a cloud-based architecture on a public cloud-services provider.

6. The method of claim 1, wherein the respective service request is transmitted to the respective service via a connector.

7. The method of claim 1, further comprising:

storing, by the orchestrator, the plurality of service requests in a queue table; and transmitting, by the orchestrator, each of the plurality of service requests to an associated service according to a time-based trigger.

8. The method of claim 1, wherein the respective service request is associated with a charging function of a stand-alone 5G network.

9. The method of claim 1, wherein the request data is received from an API configured to generate the request data based on a user input.

10. The method of claim 1, wherein for each service of the plurality of services, the method further comprises:

receiving, by the orchestrator of the computing system, data indicating a failure of the respective service request; and transmitting, by the orchestrator of the computing system, the respective service request to the endpoint of the respective service according to a retry schedule.

11. A system, comprising:

one or more processors; and a computer-readable, non-transitory memory comprising instructions that, when executed by the one or more processors, cause the system to perform operations to:

receive, by a proxy service, request data generated in response to an input from a user, the request data in a first format;

determine, by the proxy service, a plurality of services used to process two or more respective portions of the request data;

for each of the two or more portions of the request data:

determine, by the proxy service, an endpoint of a service of the plurality of services, the service associated with the respective portion of the request data;

determine, by the proxy service, a native format associated with the respective service; and forward, by the proxy service to an orchestrator, data including the respective portion of the request data, and indicating the endpoint of the service, and the native format;

generate, by the orchestrator, a respective service request based on the respective portion of the request data according to the native format;

transmit, by the orchestrator, the respective service request to the endpoint of the respective service;

generate, by an orchestrator of the system, a record of the respective service request in a staging table;

receive, by the orchestrator, respective response data from the respective service, the respective response data based at least in part on the respective service request and according to the native format; and update, by the orchestrator, the record in the staging table to include the respective response data;

determine, by the orchestrator, that the orchestrator has received respective response data from each of the plurality of services; and in response to determining that the orchestrator has received respective response data from each of the plurality of services:
    generate, by the orchestrator, a single response in the first format including the respective response data associated with each of the respective service requests; and
    provide, by the orchestrator, the single response to the user.

12. The system of claim 11, wherein the system comprises a cloud-based architecture provided by a public cloud-services provider.

13. The system of claim 11, wherein the system further performs operations to:
    receive configuration data associated with a first service of the plurality of services, the configuration data indicating at least an endpoint of the first service and a second format;
    determine connectivity from the system to the first service via the endpoint of the first service;
    in response to determining that the system has connectivity to the first service via the endpoint of the first service:
        generating, based on the configuration data, an application programming interface (API) wherein the API comprises a user interface to receive a request from the user according to the first format; and
        configuring the proxy service to generate a first service request according to the second format.

14. A non-transitory computer-readable medium comprising instructions that, when executed by a processor, cause the processor to perform operations comprising:
    receiving, by a proxy service of a computing system, request data generated in response to an input from a user, the request data in a first format;
    determining, by the proxy service, a plurality of services used to process two or more respective portions of the request data;
    for each of the two or more portions of the request data:
        determining, by the proxy service, an endpoint of a service of the plurality of services, the service associated with the respective portion of the request data;
        determining, by the proxy service, a native format associated with the respective service; and
        forwarding, by the proxy service to an orchestrator of the computing system, data including the respective portion of the request data, and indicating the endpoint of the service, and the native format;
        generating, by the orchestrator a respective service request based on the respective portion of the request data according to the native format;
        transmitting, by the orchestrator, the respective service request to the endpoint of the respective service;
        generating, by the orchestrator, a record of the respective service request in a staging table;
        receiving, by the orchestrator, respective response data from the respective service, the respective response data based at least in part on the respective service request and according to the native format; and
        updating, by the orchestrator, the record in the staging table to include the respective response data;
    determining, by the orchestrator, that the orchestrator has received respective response data from each of the plurality of services; and
    in response to determining that the orchestrator has received respective response data from each of the plurality of services:
        generating, by the orchestrator, a single response in the first format including the respective response data associated with each of the respective service requests; and
        providing, by the orchestrator of the computing system, the single response to the user.

15. The non-transitory computer-readable medium of claim 14, the operations further comprising:
    receiving, by the computing system, configuration data associated with a first service of the plurality of services, the configuration data indicating at least an endpoint of the first service and a second format;
    determining, by the computing system, connectivity to the first service via the endpoint of the first service;
    in response to determining that the computing system has connectivity to the first service via the endpoint of the first service:
        generating, by the computing system and based on the configuration data, an application programming interface (API) wherein the API comprises a user interface to receive a request from the user according to the first format; and
        configuring, by the computing system, the proxy service to generate a first service request according to the second format.

16. The non-transitory computer-readable medium of claim 15, the operations further comprising:
    receiving, by the computing system, second configuration data associated with a second service of the plurality of services, the second configuration data indicating at least an endpoint of the second service and a third format;
    determining, by the computing system, connectivity to the second service via the endpoint of the second service; and
    in response to determining that the computing system has connectivity to the second service via the endpoint of the second service:
        updating, by the computing system and based on the second configuration data, the API to receive a second request from the user according to the third format; and
        configuring, by the computing system, the proxy service to generate a second service request according to the third format.

17. The non-transitory computer-readable medium of claim 14, wherein the computing system comprises a cloud-based architecture provided by a public cloud-services provider.

* * * * *